United States Patent [19]
Tateno et al.

[11] Patent Number: 5,806,182
[45] Date of Patent: Sep. 15, 1998

[54] METHOD OF PROCESSING SCREW ROTOR

[75] Inventors: Masao Tateno; Koji Tomita, both of Tochigi, Japan

[73] Assignee: Tochigi Fuji Sangyo Kabushiki Kaisha, Tochigi-Ken, Japan

[21] Appl. No.: 726,523

[22] Filed: Oct. 7, 1996

[30] Foreign Application Priority Data

Oct. 13, 1995 [JP] Japan ..................................... 7-265641

[51] Int. Cl.$^6$ .................................................. B23P 15/00
[52] U.S. Cl. ..................... 29/888.023; 29/527.4
[58] Field of Search ........................... 29/888.023, 527.3, 29/527.4, 527.6; 418/201.1

[56] References Cited

U.S. PATENT DOCUMENTS

| | | | |
|---|---|---|---|
| 4,109,362 | 8/1978 | Ingalls | 29/888.023 |
| 4,909,337 | 3/1990 | Kochnev | 29/888.023 |
| 5,377,407 | 1/1995 | Takahashi et al. | 29/888.023 |
| 5,638,600 | 6/1997 | Rao et al. | 29/888.023 |

FOREIGN PATENT DOCUMENTS 1433132  4/1976  United Kingdom ............. 29/888.023

Primary Examiner—Irene Cuda
Attorney, Agent, or Firm—Howard & Howard

[57] ABSTRACT

A cast screw rotor has an opened lightening or reduced weight hole formed inside each thread portion. The opened hole is formed along torsion of the thread portion, and a shaft is inserted into an axial hole. The screw rotor is manufactured by a method in which each of the thread portions and the axial hole are formed on the basis of the reduced weight hole.

5 Claims, 9 Drawing Sheets

METHOD OF PROCESSING SCREW ROTOR

BACKGROUND OF THE INVENTION

1. Field of the Invention

The present invention relates to a method of processing a screw rotor manufactured by casting a metal material so as to be used in a screw type fluid-pressure machine.

2. Description of the Related Art

A screw rotor 201 as shown in FIG. 1 is disclosed in Japanese Patent Laid-Open No. 5-195701.

Rotor 201 is a male screw rotor for a screw compressor, having a body 203 and a rotor shaft 205.

In the above-mentioned male screw rotor 201, the inertia moment is enlarged since it has a large tooth thickness and the rotor body 203 is so formed as to have a solid shape. If a screw compressor comprising a rotor having a great inertia moment is employed in, for example, a super charger, the operation energy loss of the engine is enlarged excessively. As a result, fuel economy and acceleration response deteriorate excessively. Even more troubling is that the size of the clutch for engaging/disengaging the engine must be enlarged.

Accordingly, the rotor 201 has reduced weight portions 209 in thread portions 207 of the rotor body 203 to lighten the weight and reduce the inertial moment.

The rotor body 203 is, as shown in FIG. 1, formed into a stacked structure formed by joining a multiplicity of thin plates 211 and 213. Thus, the rotor body 203 is composed of a large number of parts. As a result, the manufacturing process, including a process of punching the thin plates 211 and 213 and a stacking process which is performed while twisting the thread portion 207, becomes too complicated. What is worse, the surface of the thread portion 207 must be smoothed after the thin plates 211 and 213 have been joined together. As described above, the rotor of the foregoing type cannot easily be manufactured and, therefore, is expensive to produce.

Although the screw rotor can be manufactured by an extruding process or a drawing process, these methods encounter the following problems:

(1) a screw rotor having a large torsional angle cannot be manufactured;

(2) the torsional angle cannot be made accurately and, therefore, a screw rotor having a uniform torsional angle cannot be manufactured;

(3) uniform thicknesses cannot be obtained, therefore the thickness can easily be deviated, and the manufactured rotor suffers from unsatisfactory rotation balance; and (4) a rotor having a thin thickness cannot be manufactured and weight reduction cannot satisfactorily be realized.

If the rotation balance is unsatisfactory, an excessively great cost is required to modify the balance.

SUMMARY OF THE INVENTION

Accordingly, an object of the present invention to provide a processing method capable of manufacturing a cast screw rotor having a reduced weight hole and exhibiting reduced weight and small inertia moment with a satisfactorily improved processing accuracy.

According to one aspect of the present invention, there is provided a method of processing a screw rotor in which an opened reduced weight hole is formed inside each thread portion, the opened hole being formed along torsion of the thread portion, and a shaft being inserted into an axial hole of the screw rotor, comprising the step of: forming each of the thread portions and the axial hole on the basis of the hole.

The processes are performed on the basis of the hole after the casting process has been performed. Thus, the thread portion can accurately be processed to have a predetermined thickness. Moreover, the thicknesses of the two sides of the thread portion can be made to be uniform and thickness deviation can be prevented. Moreover, the tooth portion can be made as thin as required. As a result, a light weight screw rotor exhibiting satisfactory rotation balance can be obtained with a low cost.

Since the rotor is cast, the number of elements can be reduced as compared with the conventional processing method in which thin plates are stacked. Moreover, the process can easily be performed as compared with the conventional process for forming the contour of the stacked rotor.

Moreover, a large torsional angle can be provided for the screw rotor as compared with the conventional extruding method or the drawing method, and the torsional angle can uniformly and accurately be realized.

According to another aspect of the present invention, there is provided a method of processing a screw rotor, wherein (1) the outer surface of the screw rotor is processed on the basis of the reduced weight, (2) the axial hole is formed on the basis of the processed outer surface, (3) the thread portion is subjected to a roughtooth cutting process on the basis of the formed axial hole, (4) coating is applied to the rotor subjected to the tooth cutting process, and (5) the coating layer is subjected to a finish tooth-cutting process on the basis of the axial hole.

As described above, the outer surface of the rotor is processed on the basis of the reduced weight hole, and the following processes are performed on the basis of the processed portion in the previous step so that all processes are performed on the basis of the reduced weight hole.

According to another aspect of the present invention, there is provided a method of processing a screw rotor, wherein (1) the axial hole is formed on the basis of the reduced weight hole, (2) the outer surface of the rotor is processed on the basis of the formed axial hole, (3) the thread portion is subjected to the roughtooth process on the basis of the axial hole, (4) coating is applied to the rotor subjected to the tooth cutting process and (5) the coating layer is subjected to the finish tooth-cutting process on the basis of the axial hole.

As described above, the axial hole is formed on the basis of the reduced weight hole, and the following processes are performed on the basis of the axial hole. Therefore, the machining of the thread portions can be performed at one stretch, so that the number of processes can be decreased.

According to another aspect of the present invention, there is provided a method of processing a screw rotor, wherein (1) the outer surface of the rotor is processed on the basis of the reduced weight hole, (2) the axial hole is formed on the basis of the processed outer surface, (3) the shaft is inserted into the formed axial hole, (4) the thread portion is subjected to the roughtooth cutting process on the basis of the shaft, (5) the rotor, subjected to the tooth-cutting process is applied with coating and (6) the coating layer is subjected to the finish tooth-cutting process on the basis of the shaft.

As described above, the axial hole is formed in step (2), and the shaft is inserted into the axial hole. All of the following steps are performed on the basis of the shaft. As a result, all of the processes are performed on the basis of the reduced weight hole. Therefore, an effect similar to that obtainable as described above can be obtained.

Moreover, the shaft is inserted into the screw rotor so that the screw rotor is formed into a product. When the screw rotor is operated, the screw rotor is rotated while being supported by the shaft. After the shaft has been inserted in step (3), and the rough and finish tooth-cutting processes are performed in steps (4) and (6) on the basis of the shaft. Therefore, the machining accuracy of the tooth portion is improved.

According to another aspect of the present invention, there is provided a method of processing a screw rotor, wherein (1) the outer surface of the rotor is processed on the basis of the reduced weight hole, (2) the axial hole is formed on the basis of the processed outer surface, (3) the thread portion is subjected to rough-tooth cutting process on the basis of the formed axial hole, (4) the rotor, which has been subjected to the tooth cutting process is applied with coating, (5) the shaft is inserted into the axial hole and (6) the coating layer is subjected to the finish tooth-cutting process on the basis of the shaft.

As described above, steps (1) to (4) are the same as the steps described above. Then, the shaft is inserted into the axial hole in steps (5) and (6), and then the coating layer is subject to the finish tooth-cutting process on the basis of the shaft. Therefore, all of the processes are performed on the basis of the reduced weight hole. As a result, an effect similar to that obtainable as described above can be obtained.

Since the coating layer is subject to the finish tooth-cutting process on the basis of the shaft in step (6), the machining accuracy can furthermore be improved similarly to the processing method described above.

According to another aspect of the present invention, there is provided a method of processing a screw rotor, wherein (1) the outer surface of the rotor is processed or the axial hole is formed on the basis of the reduced weight hole, (2) and the residual process is performed on the basis of the performed process, (3) rough-tooth cutting is performed on the basis of the formed axial hole, and the finish tooth-cutting process is performed, and (4) the rotor subjected to the tooth cutting process is applied with coating.

As described above, steps (1) and (2) are the same as those of the processing methods described above. Since the thread portion is subjected to the rough-tooth cutting process and the finish toothcutting process on the basis of the axial hole in step (3), the machining of the thread portion can be performed at a stretch. Therefore, the required process can be decreased. Since the thread portion accurately finished in step (3) is applied with the coating layer having a predetermined thickness in step (4), an obtained rotor applied with the coating layer and having a satisfactory accuracy exhibits an effect similar to that described above. Since the predetermined thickness is realized after the finishing process, the thickness can significantly be reduced as compared with the thickness of the coating layer of the conventional screw rotor. The time required to form the coating layer can be shortened. Moreover, the small thickness results in uneven thickness being prevented. Thus, contact of rotors and that between the rotor and the housing can be prevented.

DETAILED DESCRIPTION OF THE PREFERRED EMBODIMENTS

Figure 1:
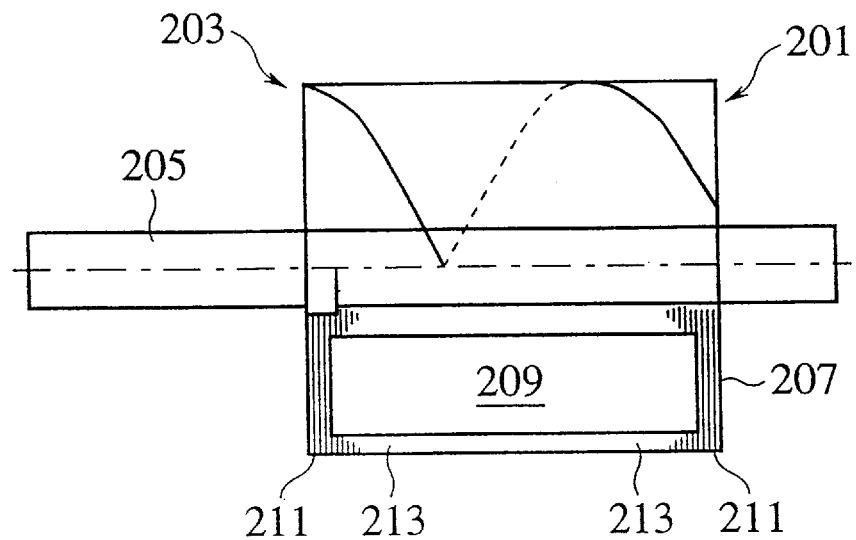
FIG. 1 is a partial cross sectional view showing a conventional screw rotor.
Figure 2:
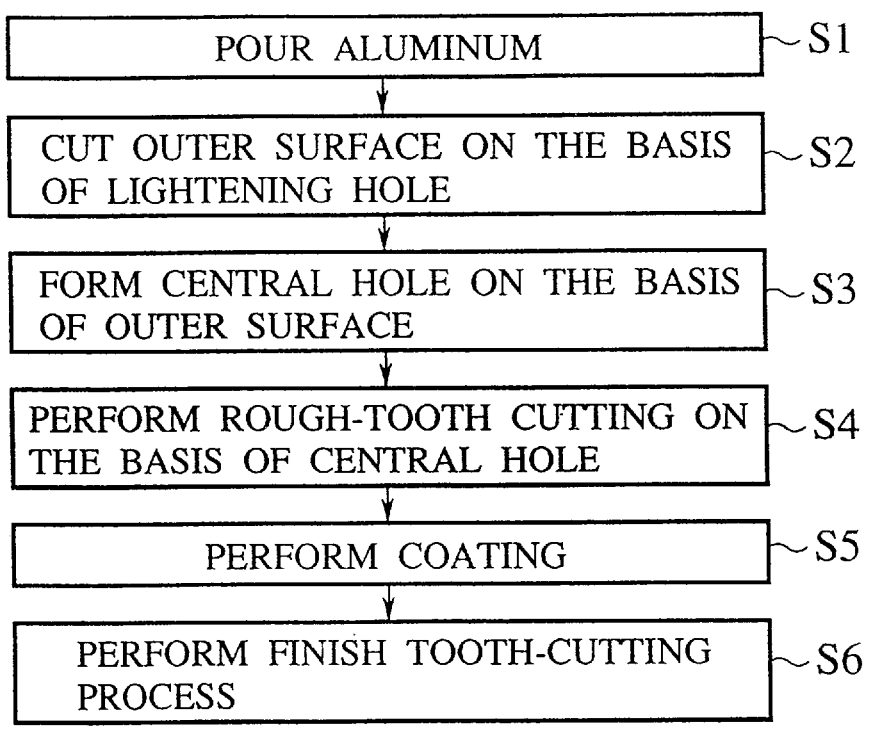
FIG. 2 is a flow chart showing a process according to a first embodiment of the present invention.

A first embodiment of the present invention will now be described with reference to FIGS. 2 to 13. FIG. 2 is a schematic flow chart of a method of manufacturing a screw rotor according to this embodiment. FIGS. 3 to 13 are diagrams showing processes of the manufacturing method according to the present invention.

In step S1 a screw rotor 1 is cast. Although the rotor 1 is processed variously after it has been cast in step S1, the reference numeral of the rotor is not changed regardless of the state thereof and, therefore, the rotor is hereinafter called as rotor 1.

Figure 3:
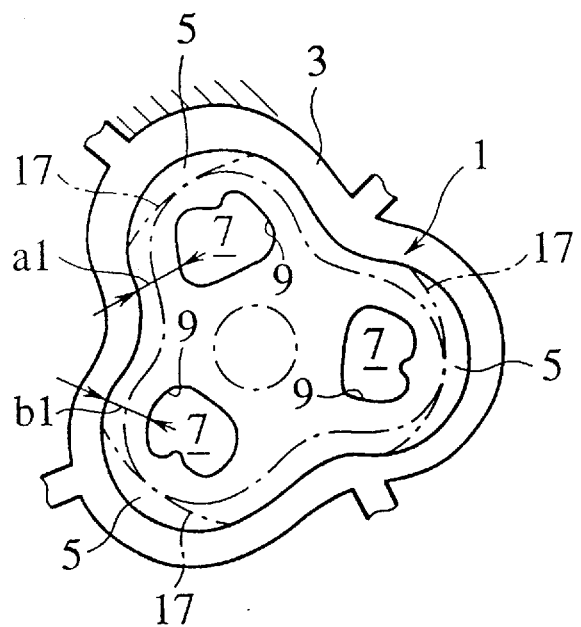
FIG. 3 is a diagram showing the shape of a cast rotor according to the first embodiment and the shape of the same realized after processed.
Figure 4:
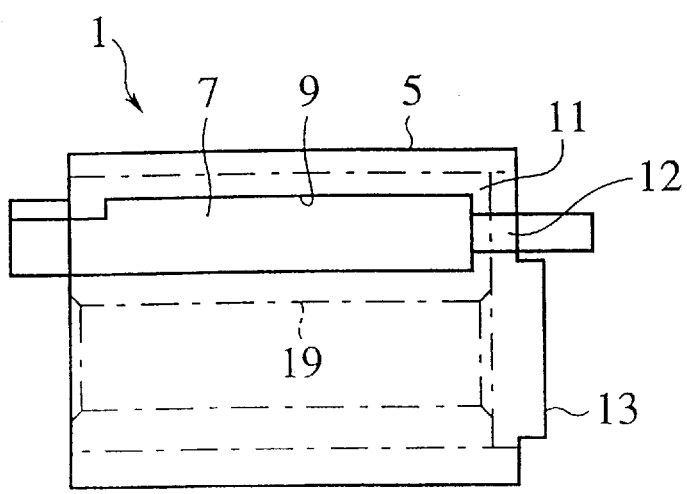
FIG. 4 is a diagram showing the position of a core which is employed at the time of performing a casting process and a shape realized after the process has been performed according to the first embodiment.

The rotor 1 is manufactured by casting aluminum by using die 3 and a core 7, as shown in FIGS. 3 and 4. When the rotor 1 is cast, each of three thread portions 5 of the rotor 1 are provided with a predetermined torsion. Moreover, a lightening or reduced weight hole 9 along the provided torsion is, by a core 7, formed under each of the thread portions 5. The thicknesses of the tooth face portions on the two sides of the thread portion 5 are made to be predetermined thicknesses a1 and b1 as shown in FIG. 3. The thickness is determined in consideration of reduction which takes place after a machining operation to be performed later is performed. Moreover, the casting operation is performed such that the tooth top of each thread portion 5 is provided with a predetermined additional thickness in consideration of reduction which takes place after the machining operation is performed. An alternate long and short dash line shown in FIGS. 3 and 4 shows the shape of the rotor 1 formed after the cast rotor 1 has been subjected to the machining process.

A boss 13 is formed at an end of the rotor 1 (see FIG. 4). A core-matrix hole 12 (see FIG. 4) formed in the side surface of the boss 13 is plugged when the machining operation is performed later so that the hole 9 is closed by an end wall 11. On the other hand, the hole 9 is opened in the end surface on the other side of the rotor 1, that is, an opening portion 15 is formed (see FIG. 5). The boss 13 is provided for use in the machining process which is performed later. The end wall 11 prevents leakage of the pressure of fluid which takes place between the high pressure portion of the rotor 1 and the low pressure portion of the same.

Figure 5:
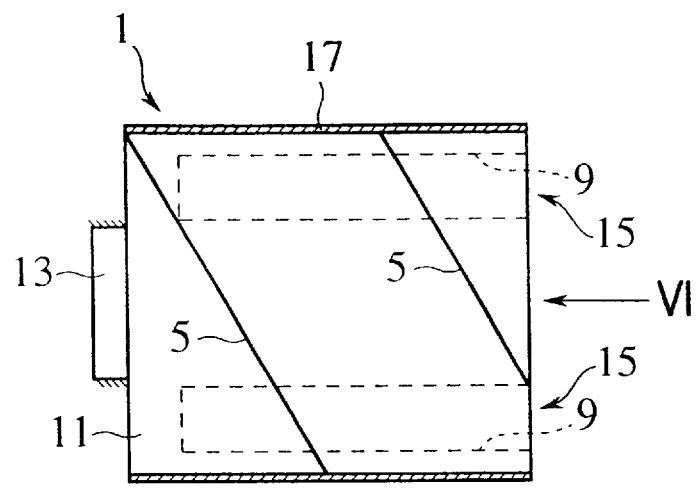
FIG. 5 is an explanatory view of the process for cutting the outer surface of the rotor on the basis of a lightening hole according to the first embodiment.
Figure 6:
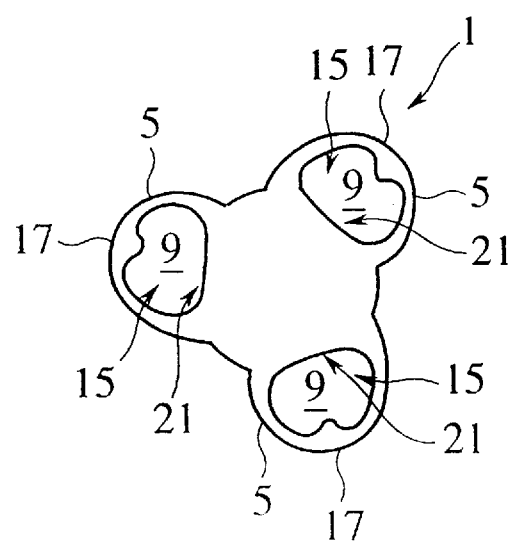
FIG. 6 is a view along line VI of FIG. 5.

In step S2 the outer surface (the contour of the rotor 1) of the thread portion 5 is formed by cutting on the basis of the reduced weight hole 9 (the opening portion 15), as shown in FIGS. 5 and 6. The process for forming the outer surface is performed on the basis of each straight portion 21 (see FIG. 6) in the opening portion 15 of the hole 9 such that the boss 13 of the rotor 1 and another end of the rotor 1 are held. Elongated diagonal line portions shown in FIG. 5 indicate portions removed by cutting. One-dotted line 17 indicates an outer surface shaped by cutting.

Figure 7:
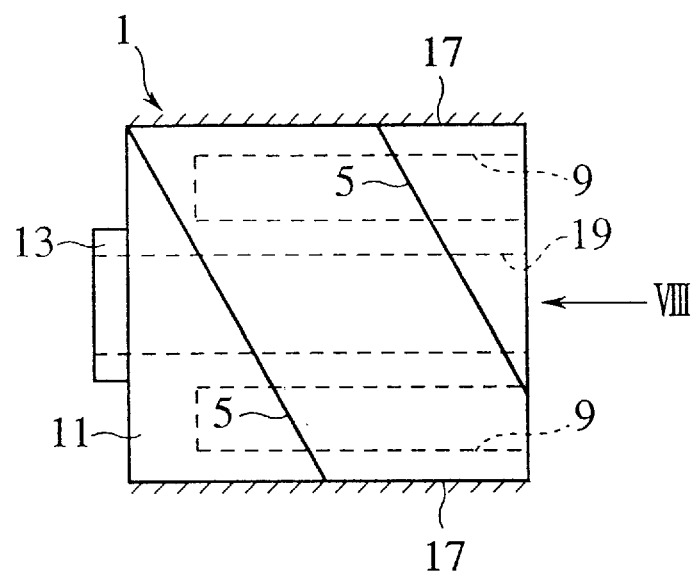
FIG. 7 is an explanatory view of the process for forming the central hole on the basis of the outer surface of the rotor according to the first embodiment.
Figure 8:
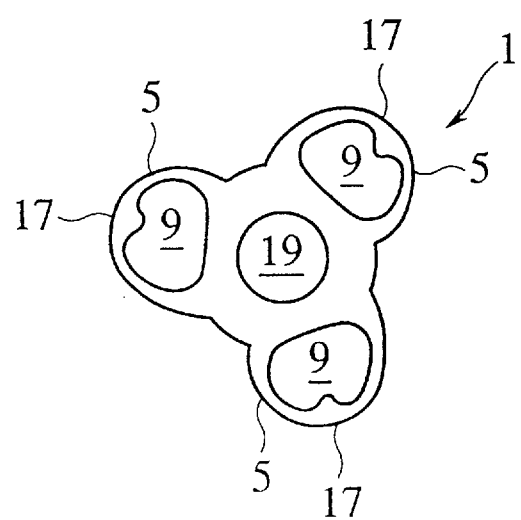
FIG. 8 is a view along line VIII of FIG. 7.
Figure 9:
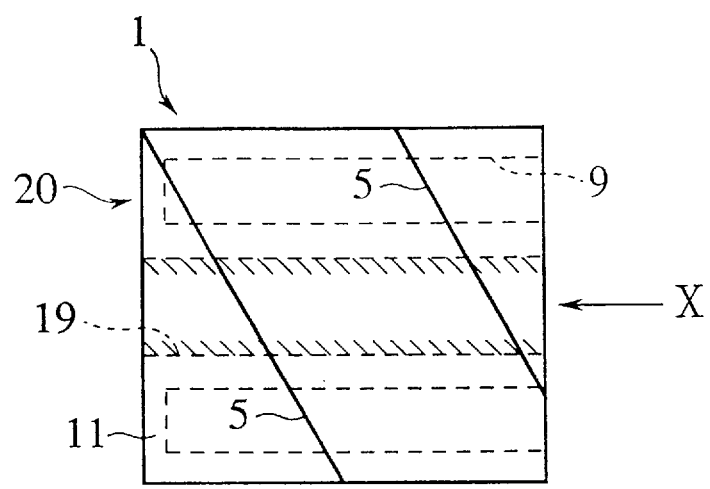
FIG. 9 is an explanatory view of a rough-tooth cutting process for the tooth portion which is performed on the basis of the central hole according to the first embodiment.

In step S3 a central hole (axial hole) 19 shown in FIGS. 7 and 8 is concentrically formed on the basis of the outer surface 17 (indicated by the diagonal lines shown in FIG. 7) shaped by cutting. Note that the boss 13 is removed by cutting after the central hole 19 has been formed. Even after the boss 13 has been removed by cutting, the end wall 11 is retained at an end 20 of one side of the rotor 1 as shown in FIG. 9. The rotor 1 is disposed in such a manner that the end wall 11 is positioned adjacent to the discharge portion of a fluid-pressure machine. The end wall 11 enables communication and leakage of compressed fluid in the fluid-pressure machine to the hole 9 to be prevented.

Figure 10:
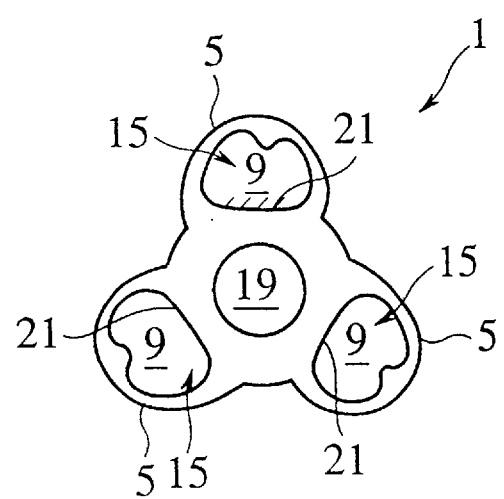
FIG. 10 is a view along line X of FIG. 9.
Figure 11:
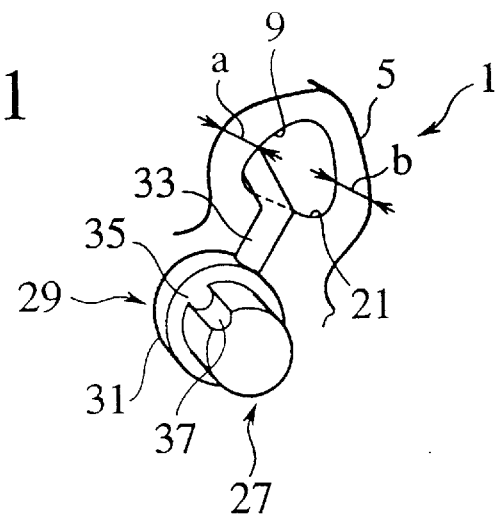
FIG. 11 is an explanatory view of a method of phase alignment with respect to the lightening hole when the roughtooth cutting process is performed according to the first embodiment.

The straight portion 21 of either of the opening portions 15 is made to be horizontal on the basis of the central hole 19 as shown in FIGS. 9 and 10 to subject the thread portion 5 of the rotor 1 to a rough-tooth-cutting process (step S4). Specifically, a dummy shaft 27 for use in the tooth-cutting process is inserted into the central hole 19, as shown in FIG. 11, and then a projection 35 of a position-alignment jig 29 is engaged to a recess 37 of the dummy shaft 27 so as to mount the position-alignment jig 29. Then, a position-alignment pin 33 of the position-alignment jig 29 is brought into contact with the circumferential (rotational) end of an opening portion 15. Then, the phase of the cutter blade is aligned in such a manner that the thicknesses a and k of the two sides of the thread portion 5 are made to be predetermined values after the machining process has been completed, and then the rough-tooth cutting operation is performed. The thicknesses a and b are made to be the same or different values to be adaptable to the difference in the strength. If the phase alignment is performed in such a manner that one of the thicknesses a and b is made to be a predetermined value, the tooth cutting operation can easily be performed.

Figure 12:
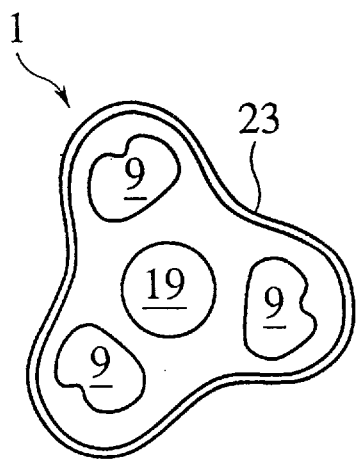
FIG. 12 is an explanatory view of a state where the surface of the rotor according to the first embodiment is applied with coating.

Then, as shown in FIG. 12, the surface of the rotor 1 is applied with a coating (step S5). A coating layer 23 is formed in order to prevent scoring, eccentric abrasion and pressure leakage if the rotor 1 comes in contact with another rotor or the case accommodating the rotor 1 during rotations of the rotor 1.

Figure 13:
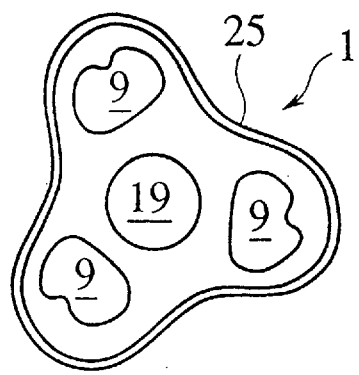
FIG. 13 is an explanatory view of a state according to the first embodiment in which the coating layer is subjected to the finish tooth-cutting process.

Similarly to step S4 (the rough-tooth-cutting process), phase alignment with the hole 9 is performed on the basis of the central hole 19 to subject each thread portion 5 (the coating layer 23) to a finish tooth-cutting process. As a result, the final thread portion 5 (a coating layer 25) is formed as shown in FIG. 13 (step S6), and then the machining process is completed.

As described above, all of the foregoing processes, which are performed in steps Si to S6 and which include the process for forming the outer surface 17 of the rotor 1, the process for forming the central hole 19, the process for providing the rough-tooth for the thread portion 5 and the finish tooth-cutting process, are performed by using the opening portion 15 of the rotor 1 on the basis of the hole 9.

Note that the foregoing sequential order of the processes may be changed such that step S2 (the process for forming the outer surface 17 on the basis of the lightening hole 9) and step S3 (the process for forming the central hole 19 on the basis of the outer surface 17) are changed. In this case, the process for forming the central hole 19 on the basis of the hole 9 is performed, and then the process for forming the outer surface 17 on the basis of the central hole 19 is performed.

Since the method according to this embodiment is structured such that the outer surface 17 is formed on the basis of the hole 9 and then all of the following processes are performed on the basis of the machined portion in the previous process, all of the processes are performed on the basis of the hole. Therefore, the tooth cutting process for forming the thread portion 5 and the other processes can accurately be performed so that the thicknesses a and b of the thread portion are made to be uniform and thicknesses deviation is prevented. Moreover, the thickness can be reduced to a required value. As a result, a rotor 1 exhibiting light weight and satisfactory rotation balance can easily be obtained with a low cost.

Since the rotor 1 is a cast rotor, the number of elements can be reduced as compared with the conventional processing method in which thin plates are stacked. Moreover, the process can easily be performed as compared with the process for forming the contour of the stacked rotor.

Moreover, a large torsional angle can be provided for the screw rotor as compared with the conventional extruding method or the drawing method, and the torsional angle can uniformly and accurately be realized.

Figure 14:
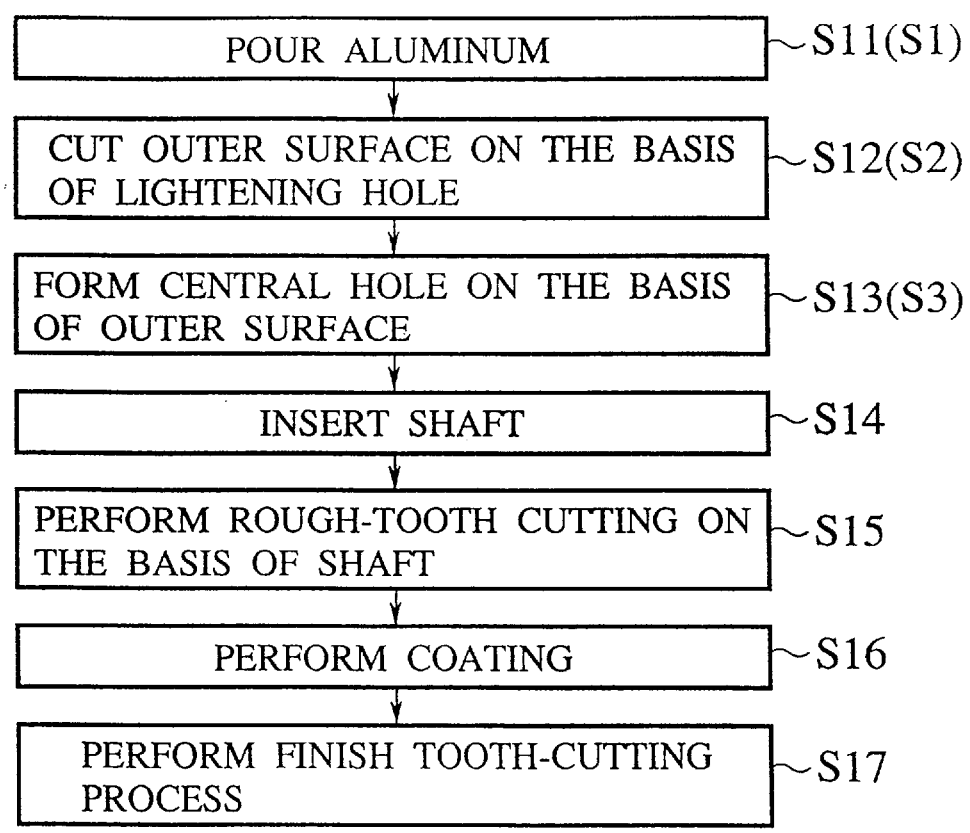
FIG. 14 is a flow chart showing the process according to a second embodiment.

A second embodiment of the present invention will now be described with reference to FIG. 14. FIG. 14 is a flow chart schematically showing the process for manufacturing a screw rotor according to this embodiment.

This embodiment is different from the above-mentioned first embodiment in that the central hole 19 is formed (which corresponds to step S3 according to the first embodiment), and then a shaft is inserted into the central hole 19 before the tooth cutting process is performed on the basis of the shaft. That is, after the central hole 19 has been formed, the following processes are performed on the basis of the inserted shaft. Note that the same elements of the rotor 1 are given the same reference numerals as those according to the first embodiment.

Steps S11, S12 and S13 (in the flow chart shown in FIG. 14) according to this embodiment are the same as steps S1, S2 and S3 of the first embodiment (in the flow chart shown in FIG. 2). Therefore, the same steps are omitted from description. Thus, description starts at step S14.

In step S14 a shaft (not shown) is forcibly inserted into the central hole 19 formed in step S13. In step S15 the thread portion 5 is subjected to a rough-tooth cutting process on the basis of the inserted shaft. When the roughtooth cutting process is performed, a position alignment jig similar to that employed in the phase alignment process which is performed in step S4 according to the first embodiment is used to align the cutting blade with respect to the lightening hole 9 by using the inserted shaft. Note that the inserted shaft is an element of the rotor 1 which supports the rotor 1 when the rotor 1 included in the compressor is rotated.

A coating process in step S16 is performed in the same manner as that of step S5 according to the first embodiment. Then, the thread portion 5 applied with the coating is subjected to a finish tooth-cutting process (step S17), and then the process is completed.

As compared with the first embodiment in which the tooth cutting process is performed on the basis of the central hole 19, this embodiment has the structure such that the rough and finish tooth-cutting processes are performed on the basis of the shaft inserted into the central hole 19. That is, the rough and finish tooth-cutting processes are performed on the basis of the shaft which supports the rotor 1 when the rotor 1 is rotated. Therefore, a similar effect obtainable from the first embodiment can be attained, and the machining accuracy can furthermore be improved.

Figure 15:
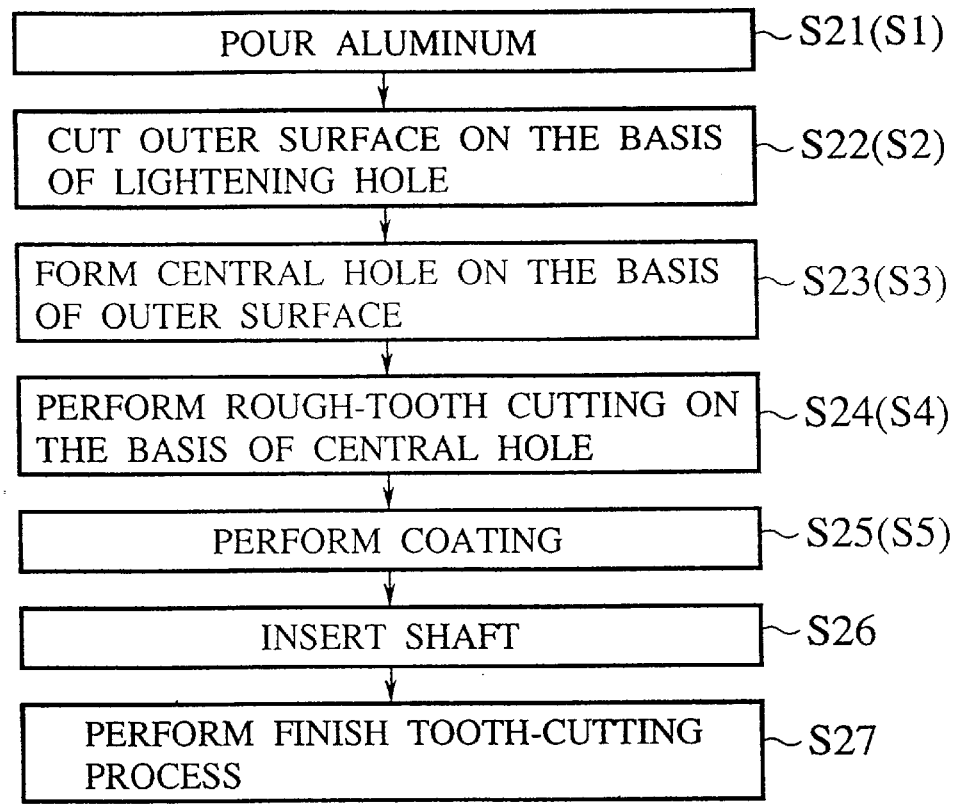
FIG. 15 is a flow chart showing the process according to a third embodiment.

Referring to FIG. 15, a third embodiment of the present invention will now be described. FIG. 15 is a flow chart of a method of manufacturing a screw rotor according to this embodiment.

This embodiment is different from the first embodiment in that a shaft is inserted into the central hole 19 of the rotor 1 immediately before the finish tooth-cutting process, which is the final process, is performed. The finish tooth-cutting process is performed on the basis of the shaft. Note that the same elements of the rotor 1 are given the same reference numerals as those of the rotor 1 according to the first embodiment.

Steps S21, S22, S23, S24 and S25 (in the flow chart shown in FIG. 15) according to this embodiment are the same as steps S1, S2, S3, S4 and S5 of the first embodiment (in the flow chart shown in FIG. 2). Therefore, the same steps are omitted from description. Thus, description starts at step S26.

In step S26 the shaft (not shown) is inserted into the central hole 19 processed in step S23. Then, the thread portion 5 applied with the coating is subject to a finish tooth-cutting process on the basis of the inserted shaft (step S27). The finish tooth-cutting process is the same as that in step S17 according to the second embodiment.

Note that the shaft is an element of the rotor 1 which supports the rotor 1.

As described above, this embodiment has the structure such that the shaft is inserted into the central hole 19 of the rotor 1 immediately before the finish tooth-cutting process, which is the final process, is performed. That is, the finish tooth-cutting process is performed on the basis of the shaft in a state where the shaft has been inserted, the shaft being arranged to support the rotor 1 when the rotor 1 is rotated. Therefore, a similar effect obtainable from the first embodiment can be obtained. Moreover, the accuracy of the process can be improved similarly to the second embodiment.

Figure 16:
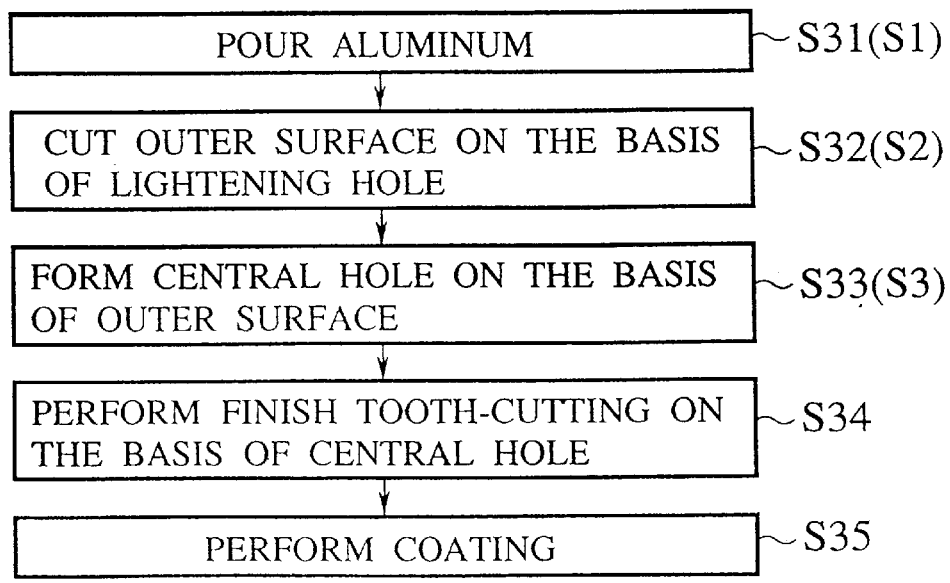
FIG. 16 is a flow chart showing the process according to a fourth embodiment.

A fourth embodiment of the present invention will now be described with reference to FIG. 16. FIG. 16 is a flow chart schematically showing the process for manufacturing a screw rotor according to this embodiment. The same elements as those according to the first to third embodiments shown in FIGS. 3 to 13 are given the same reference numerals.

Steps S31, S32 and S33 (in the flow chart shown in FIG. 16) are the same as steps S1, S2 and S3 (in the flow chart shown in FIG. 2) according to the first embodiment. Therefore, the same elements are omitted from description, and the description starts at step S34.

In step S34 a dummy shaft 27 for cutting the tooth is inserted into the central hole 19 formed in step S33. The dummy shaft 27 is chucked at the two ends of the rotor 1, or the two ends of the central hole 19 of the rotor 1 are directly held, or the shaft is chucked by the two ends of the rotor 1 after the shaft, which is the element of the rotor 1, has been fixed. Then, the shaft is chucked at the two ends of the rotor 1 so that the process for rough-tooth cutting the thread portion 5 and the finish tooth-cutting process is performed while aligning the phases. As a result, the tooth cutting processes can successively be performed in one process. Thus, the number of the processing steps can be decreased and the rotor 1 can accurately be processed.

In step S35 the rotor 1, subjected to the finish toothcutting process, is applied with a coating layer having a predetermined thickness.

As described above, this embodiment is different from the first to third embodiments in that the finish toothcutting process is not performed after the coating process has been performed. Therefore, the thickness of the coating layer can be reduced to ¼ of the coating layer of a conventional screw rotor, that is, 30 m or thinner. As a result, time required to form the coating layer can be shortened, and a thin and uniform coating layer can be formed. Thus, a variety of coating forming means may be employed. When the rotor 1 is operated, contact with another rotor or the housing can be prevented and separation of the coating layer can be prevented. As a matter of course, an effect similar to that obtainable from the first embodiment can be obtained.

Note that the sequential order of the processes shown in FIG. 16 may be changed such that step S32 (the outer surface 17 is formed on the basis of the lightening hole 9) and step S33 (the central hole 19 is formed on the basis of the outer surface 17) are changed. As a result, the central hole 19 is formed on the basis of the lightening hole 9 and then the outer surface 17 is formed on the basis of the central hole 19.

Note that the method of casting the rotor 1 according to each of the above-mentioned embodiments is not limited to the method using the core. For example, a precise casting method, such as a lost form, may be employed in which wax or expandable styrol is used to make a model; and a mold formed around the model is used to cast the rotor.

What is claimed is:

1. A method of processing a screw rotor comprising the steps of:

(1) casting a screw rotor, said screw rotor as cast having a plurality of thread portions formed spirally and a plurality of opened lightening holes formed inside said thread portions, respectively, and formed spirally so as to extend along said thread portions;

(2) processing an outer surface of said screw rotor as a datum plane of said lightening holes;

(3) forming an axial hole at the center of said screw rotor, as a datum plane of the processed outer surface;

(4) rough cutting said thread portions as a datum plane of said formed axial hole;

(5) applying coating to said outer surface of said screw rotor including said rough cut thread portions; and (6) finishing the coating layer at said datum plane of said axial hole.

2. A method of processing a screw rotor comprising the steps of:

(1) casting a screw rotor, said screw rotor as cast having a plurality of thread portions formed spirally and a plurality of opened lightening holes formed inside said thread portions, respectively, and formed spirally so as to extend along said thread portions, respectively;

(2) forming an axial hole at the center of said screw rotor, as a datum plane of said lightening holes;

(3) processing an outer surface of said screw rotor as a datum plane of the axial hole;

(4) rough cutting said thread portions as a datum plane of said formed axial hole;

(5) applying coating to said outer surface of said screw rotor including said rough cut thread portions; and (6) finishing the coating layer at said datum plane of the axial hole.

3. A method of processing a screw rotor comprising the steps of:

(1) casting a screw rotor, said screw rotor as cast having a plurality of thread portions formed spirally and a plurality of opened lightening holes formed inside said thread portions, respectively, and formed spirally so as to extend along said thread portions, respectively;

(2) processing an outer surface of said screw rotor as a datum plane of said lightening holes;

(3) forming an axial hole at the center of said screw rotor, as a datum plane of said processed outer surface;

(4) inserting a shaft into said formed axial hole;

(5) rough cutting said thread portions as a datum of said shaft;

(6) applying coating to said outer surface of said screw rotor including said rough cut thread portions; and (7) finishing the coating layer at said datum plane of said shaft.

4. A method of processing a screw rotor comprising the steps of:

(1) casting a screw rotor, said screw rotor as cast having a plurality of thread portions formed spirally and a plurality of opened lightening holes formed inside said thread portions, respectively, and formed spirally so as to extend along said thread portions, respectively;

(2) processing an outer surface of said screw rotor as a datum plane of said processed outer surface;

(3) rough cutting said thread portions as a datum of the axial hole;

(4) applying coating to said outer surface of said screw rotor including said rough cut thread portions;

(5) inserting a shaft into said formed axial hole; and (6) finishing the coating layer at said datum plane of said shaft.

5. A method of processing a screw rotor comprising the steps of:

(1) casting a screw rotor, said screw rotor as cast having a plurality of thread portions formed spirally and a plurality of opened lightening holes formed inside said thread portions, respectively, and formed spirally so as to extend along said thread portions, respectively;

(2) processing one of an outer surface of said screw rotor and an axial hole at the center of said screw rotor, as a datum plane of said lightening holes;

(3) processing the other of said outer surface of said screw rotor and said axial hole at the center of said screw rotor, as a datum of the previously processed one;

(4) rough cutting said thread portions as the datum of the axial hole;

(5) applying coating to the outer surface of said screw rotor including said rough cut thread portions.

\* \* \* \* \*